United States Patent [19]
Yamamoto et al.

[11] Patent Number: 4,566,124
[45] Date of Patent: Jan. 21, 1986

[54] PATTERN READING SYSTEM

[75] Inventors: Kazuhiko Yamamoto, Ushiku; Taiichi Saito, Ibaraki, both of Japan

[73] Assignee: Agency of Industrial Science & Technology, Ministry of International Trade & Industry, Tokyo, Japan

[21] Appl. No.: 521,956

[22] Filed: Aug. 10, 1983

[30] Foreign Application Priority Data

Aug. 10, 1982 [JP] Japan .................................. 57-139059

[51] Int. Cl.$^4$ .............................................. G06K 9/78
[52] U.S. Cl. ......................................... 382/21; 382/22; 382/60
[58] Field of Search ......................... 382/21, 22, 26, 60

[56] References Cited

U.S. PATENT DOCUMENTS

| | | | |
|---|---|---|---|
| 3,609,685 | 9/1971 | Deutsch ................................. | 382/21 |
| 3,987,412 | 10/1976 | Morrin, II ............................. | 382/21 |
| 4,228,421 | 10/1980 | Asada ..................................... | 382/30 |
| 4,428,077 | 1/1984 | Shimada et al. ....................... | 382/22 |

OTHER PUBLICATIONS

Yamamoto et al., "Recognition of Handprinted Characters by an Outermost Point Method," *Pattern Recognition*, vol. 12, No. 4, 1980, pp. 229-236.

Larson et al., *Calculus with Analytic Geometry*, 1979, pp. 581-584.

*Primary Examiner*—Leo H. Boudreau
*Assistant Examiner*—Joseph Mancuso
*Attorney, Agent, or Firm*—Oblon, Fisher, Spivak, McClelland & Maier

[57] ABSTRACT

A pattern reading system by line segment approximation comprising the steps of tracing the contour and simultaneously, seeking out as candidate extreme points the points at which the inner products of coordinate point vectors and directional vectors at coordinate points of the contour being traced are largest, and feeding out these candidate extreme points as real extreme points when the differences between the inner products of the direction vectors and the inner products of the candidate extreme points are greater than an allowance set in advance.

4 Claims, 14 Drawing Figures

PATTERN READING SYSTEM

BACKGROUND OF THE INVENTION

This invention relates to a pattern reading system to be used for the recognition of characters and figures, and more particularly to a pattern reading system which, in the polygonal approximation of a given pattern such as characters and figures by the tracing of the contours of component characters and figures, enables such characters and figures to be approximated with polygons without bothering with minute convexities and concavities in their contours by allowing for tolerances in the calculation of inner products.

Differently from other characters, handwritten characters do not have fixed patterns and, therefore, are difficult to recognize. As a general measure for pattern recognition, there can be mentioned the feature extraction method which consists in providing a thinning operation and line approximation of patterns such as characters and figures or in effecting recognition of convexities and concavities in line segments of such patterns by extracting the geometric features of the character including the background (white region) by means of parallel processing. The former extraction method by use of axial line approximation of patterns suffers a disadvantage in that the characteristics of a pattern are confused due to the occurrence of unnecessary segments called "whiskers" which are involved in effecting the thinning operation for patterns and the disappearance of the delicate shapes of the patterns caused by the thinning operation and that the approximation of curves adds to the complexity of the representation of the curves.

The apparatus for accomplishing the extraction method for extracting the concave and convex segments of the given pattern by use of a two-dimensional parallel processor in accordance with a two-dimensional parallel processing is remarkably complicated and inevitably turns out to be expensive.

For the purpose of eliminating the disadvantages suffered by the conventional feature extraction methods, a group of studies including one by the present inventors resulted in the development of the systems disclosed in Japanese Patent Publications No. 1037/1982, and No. 23302/1982, (corresponding to U.S. Ser. No. 84,168, filed Oct. 12, 1979.)

These systems are based on one and the same operating principle that desired recognition of a given pattern is accomplished by tracing the contours of the pattern, determining a plurality of outermost points of the pattern in accordance with the distances from the starting point of tracing along the contours traced to these outermost points and the integrated values of the coordinates of these outermost points, dividing the contours into convex segments, concave segments, and hole segments in accordance with the data on the outermost points thereby quantizing the characteristics of the pattern and matching the quantized characteristics with entries in a dictionary prepared in advance.

The pattern reading principle described above provides global extraction of feature of the pattern without being affected by relatively minute local convexities and concavities in the contours. When the pattern happens to contain a convex structure within a concave structure, however, the systems of this principle are compelled to repeat the tracing of the portion of concave structure of the pattern. Since minute local convexities and concavities of the contours are recognized as such by relative decisions, there are times when these decisions will lack uniformity.

SUMMARY OF THE INVENTION

The object of this invention is to provide a pattern reading system by use of the approximation of line segments of the pattern, which system effects easy and accurate extraction of features of convex and concave structures of the pattern including their inner structures by having the contours of the pattern traced just once and, at the same time, provides polygonal approximation of the pattern without bothering with those minute convexities and concavities of contours which are smaller than a prescribed level (allowance).

To accomplish the object described above according to this invention, there is provided a pattern reading system using segment approximation of a given pattern, which comprises tracing the contours of the pattern to obtain several directional vectors for each partial coordinate point on the contours, determining from among the rows of partial coordinate points the maximum inner product points at which the inner products of the vectors of the coordinate points and the several directional vectors become maximum, feeding out as outputs those maximum inner products whose differences between the inner products of the directional vectors and the inner products of the aforementioned points of maximum inner products exceed the prescribed allowance, and taking these outputs of maximum inner products as representing segment approximation of the contours.

The polygonal approximation of a pattern without bothering with minute convexities and concavities in contours of the pattern can be accomplished, therefore, by finding the projections of the vectors of the points of the contours on each of the directional vectors in a total of 16 directions, for example, while tracing the contours, detecting the outermost points giving the maximum projections in the individual directions with respect to all the points of the contours, determining the maximum inner products in accordance with the results of the detection of the outermost points and, during the determination of the inner products from the projections in the individual directions, comparing the magnitudes of such projections with the prescribed allowance thereby feeding out the extreme points.

The other objects and characteristic features of the present invention will become apparent to those skilled in the art from the following description of a preferred embodiment illustrated in the accompanying drawings.

DESCRIPTION OF THE PREFERRED EMBODIMENT

This invention relates to a pattern reading system which effects recognition of a given pattern in the form of a character or figure by tracing the contour of this pattern and, at the same time, seeking out the extreme points in accordance with the directional vectors in a total of 16 directions with respect to the points of the contour, and determining convex and concave structures of the contour by using the points of maximum inner products determined in accordance with the extreme points sought out above as the points for line-segment approximation.

Figure 1:
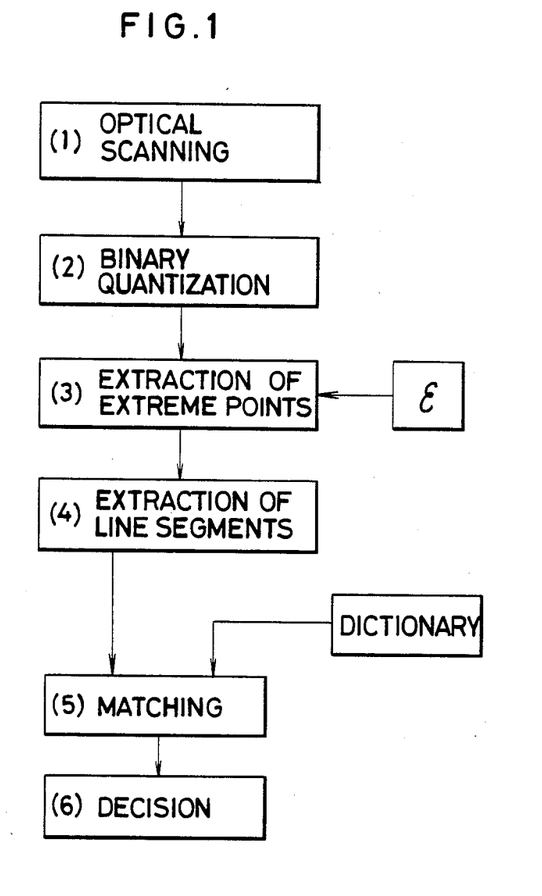
FIG. 1 is an explanatory block diagram outlining the system for pattern reading according to the present invention.

As is clear from the schematic block diagram of FIG. 1, the pattern reading system according to this invention comprises the following process steps.

(1) Optical scanning: The pattern of a character or figure fed in to be read by this system is read out as a two-dimensional pattern by a suitable image pickup device or a scanner. In the typical embodiment illustrated herein, a CCD scanner having 64×64 image element bits derives two-dimensional bright-dark data from the input pattern in 16 gray levels of shade.

(2) Binary quantization: The bright-dark data of the pattern secured by the optical scanning in the image element bits are quantized in the binary notation with the average density of the entire pattern as the standard. The binary pattern signals thus obtained are stored in a two-dimensional memory. From this point onward, the scanning of the pattern and the tracing of the contour will be carried out based on the binary pattern signals thus stored in the two-dimensional memory.

(3) Extraction of extreme points: The extreme points are extracted by scanning the binary pattern stored in the two-dimensional memory and, at the same time, tracing the contour of the pattern. This extraction of extreme points constitutes a characteristic element of the present invention and will be described more fully afterward.

(4) Extraction of feature line segments: From the extreme points found by tracing the contour of the pattern as described above, a polygonally approximated pattern is obtained by subjecting these extreme points to polygonal approximation. The line segments which make up the polygonally approximated pattern are divided into concave segments, convex segments, and hole segments which represent hollow structures of line segments by the method to be fully described afterward. A feature quantity is found with respect to the line segments of each of the varying kinds mentioned above.

(5) Matching: The feature line segments obtained as described above are compared with the entries of a dictionary prepared in advance by a learning process.

(6) Decision: The entries of the dictionary which show maximum agreement under the condition that a specific allowance is set for the matching of the feature line segments with the dictionary are fed out as a result of the decision.

The steps (1) and (2) mentioned above are not exclusive for the system of this invention. Any conventional techniques capable of optically scanning the pattern of the character or figure and quantizing the bright-dark data of the pattern in the binary notation may be freely adopted in their place.

The extraction of the extreme points in the step (3) mentioned above is started with fixing an origin for starting the tracing of the contour of the binary quantized pattern. Any point on the contour of the given pattern may be used as the origin. Here, the fixing of this origin is effected by the following method, for example.

Figure 4:
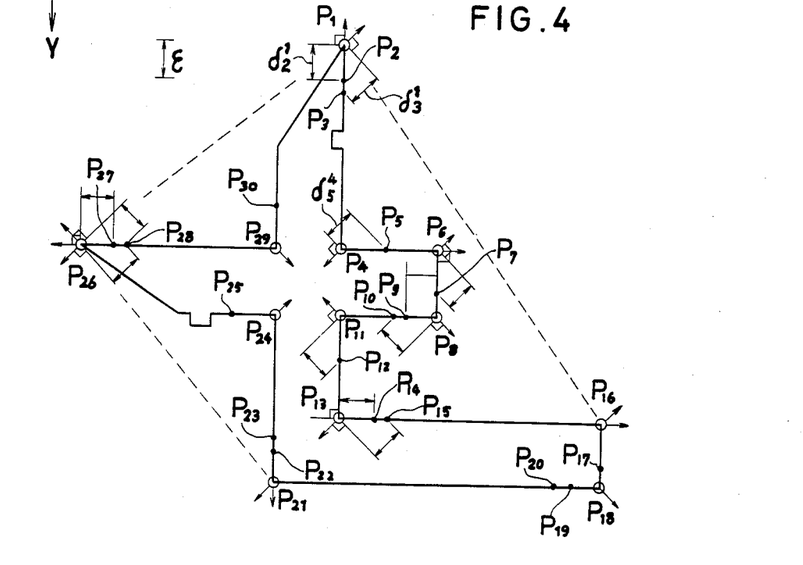
FIG. 4 is an explanatory diagram illustrating the process of extraction of extreme points adopted for the present invention.

On the two-dimensional data incorporating the binary quantized pattern, the main scanning is performed left to right downwardly from the uppermost row. In this case, the point at which the first dark bit (one point of the pattern given to be recognized) is found will be adopted as the origin for starting the tracing of the contour. In the diagram of FIG. 4, the point indicated as $P_1$ is the origin under discussion. From this point $P_1$, the tracing is started and advanced along the contour of the pattern. While the tracing proceeds, extreme points are sought with respect to all the plurality of prescribed directions. Where the given pattern of the character or figure is composed of a plurality of blocks, the contour of the first block on which the first origin is sought out in the course of scanning is traced throughout the entire periphery back to the origin. Then the processing is shifted from the "tracing mode" to the "scanning mode" to start the scanning from the first origin. This scanning is continued until the second block is caught by scanning. The point at which the second block is first caught constitutes the origin for starting the tracing of the contour of the second block. At the moment the scanning arrives at the origin of the second block, the "scanning mode" is shifted to the "tracing mode". Thereafter, the same cycle of steps will be repeated on each of the remaining blocks of the pattern. Naturally, on the interior of the "hole" enclosed with a dark line, the same cycle of the steps of the scanning for catching the origin and the tracing of the contour is carried out in much the same way as on the second block described above. In the present embodiment, the tracing of the contour of the pattern will be described as proceeding clockwise (counterclockwise along the contour of the "hole"). When occasion demands, this direction of scanning may be reversed.

Now, the concept of the outermost points to be sequentially sought out with respect to all the plurality of directions along with the advance of the tracing of the pattern and the method for determining such outermost points will be described below.

A pattern such as a character, whether printed or handwritten, is composed of a plurality of lines. Even just one of the line segments making up the pattern is recognized as a dark region of a certain thickness in terms of the level of shade. The contour of this line segment is indicated in the form of a closed enveloping line. In the model diagrams of FIG. 3 and FIG. 4, therefore, the interiors of the closed enveloping lines constitute dark regions.

Figure 3:
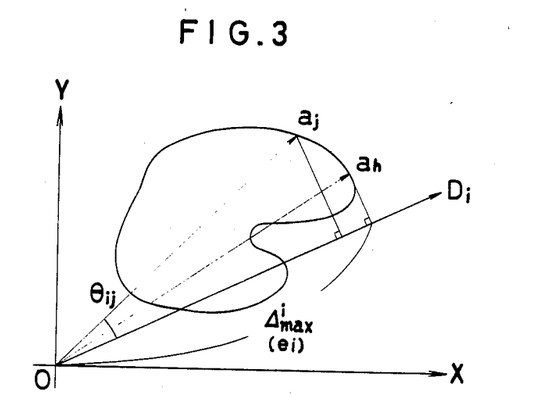
FIG. 3 is an explanatory diagram illustrating the principle of extraction of outermost points adopted in the present invention.

When the contour of the pattern is given, as shown in FIG. 3, the outermost points with respect to the specific direction $D_i$ are determined as the projection $\Delta i$ of the vector $a_j$ of the point of contour upon the directional vector $e_i$ in accordance with the formula (1) shown below.

$$\Delta i = |a_j| \cdot \cos\theta_{ij} = |a_j| \cdot \frac{(a_j \cdot e_i)}{|a_j| \cdot |e_i|} = \frac{(a_j e_i)}{|e_i|}$$

wherein $\theta_{ij}$ denotes the angle formed by the vector $a_j$ of the point of contour and the directional vector $e_i$. Thus, the point $(a_h)$ at which the projection $\Delta_i$ reaches its maximum constitutes the outermost point in the direction $D_i$.

Figure 2:
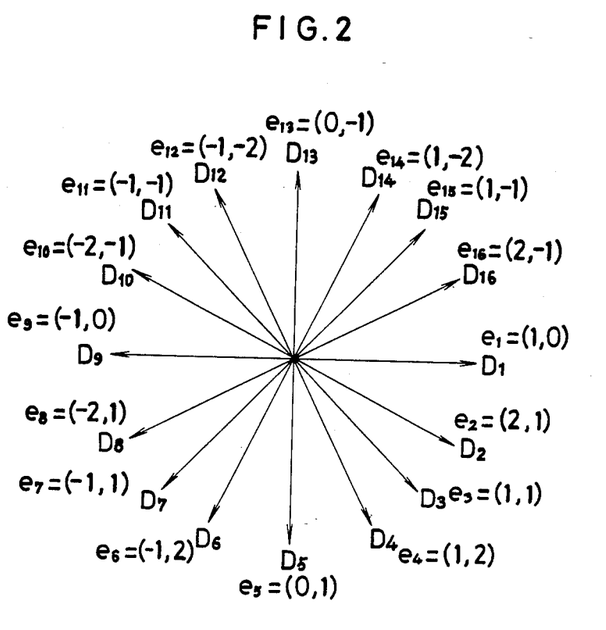
FIG. 2 is a diagram illustrating the individual directions involved in seeking the extreme points and the directional vectors in such directions.

A total of 16 specific directions as illustrated in FIG. 2 are fixed, for example. Then, the outermost points will be sought in the manner described above with respect to each of the 16 directions, $D_1$-$D_{16}$. To be more specific, while the tracing of the contour of the pattern is in process, the vector values with respect to all the directions are obtained in accordance with the formula (1). The values thus obtained are compared with those similarly determined at the next point of the tracing and those values found to be greater by this comparison are sequentially rewritten in a memory. This cycle is repeated until the entire contour of the pattern is completely traced. The set of values which finally remain in the memory, therefore, represent the maximum values with respect to the 16 directions. The points at which these maximum values are read out constitute the outermost points of the pattern. By adjacently connecting these outermost points with a continuous line, there is obtained a pattern which expresses the given pattern with a convexly closed enveloping line. For a pattern such as is illustrated in FIG. 3, there is obtained a polygonally approximated pattern excluding the concave portion. In this case, since the detection of maximum values is carried out for each of the directions, the values detected are not required to be divided by the value, $|e_i|$, of the directional vector which is the denominator of the formula (1). Further since the x, y components of the directional vector $e_i$ are 0, $\pm 1$, and $\pm 2$ as shown in FIG. 2, the inner products can be calculated simply with the operations of shift, addition, and complement. Thus, the system of this invention has no need for any complicated arithmetic operation. This means that this system permits notable simplification of the arithmetic circuit and great addition to the speed of arithmetic operations.

The extraction of characteristic line segments of the pattern described above expresses the feature of a given pattern with respect to each of the plurality of directions and is therefore called the "outermost point listing method".

The present invention might well be called the "extreme point listing method". By fixing a specific allowance for the aforementioned calculation of inner products, deciding the comparison of directional vectors for each of the plurality of directions on the basis of this allowance, and providing the system with a switch function capable of setting specific directions in a non-responding status, the system of this invention is allowed to exclude unnecessary components such as noises and, at the same time, effect polygonal approximation which faithfully reflects the characteristic of the given pattern. This "extreme point listing method" is capable of discerning the dented line segments shown in FIG. 3 which the aforementioned "outermost point listing method" has inevitably overlooked.

Now, the step of the extraction of feature line segments in this "extreme point listing method" will be described in detail below. For simplicity of description, the operation of this system is assumed here as involving the eight directions ($D_1$, $D_3$, $D_5$, ... $D_{15}$), namely the 16 directions of FIG. 2 minus the even-numbered directions. Of course, this invention does not contemplate imposing any limitation on the number of directions to be specified. The number of directions may be properly fixed to suit the complexity of the pattern concerned and the resolving power required.

When the pattern shown in FIG. 4 is given to be recognized, for example, the point $P_1$ at the uppermost corner of the pattern is regarded as the origin for starting the tracing of the contour of this pattern and, at the same time, the point $P_1$ constitutes itself a candidate for the outermost point in the direction $D_{13}$. Since the contour is traced clockwise, there is a possibility that the origin $P_1$ will be decided simultaneously as a common extreme point in the directions $D_{13}$, $D_{15}$, $D_1$, and $D_3$. To preclude this possibility, therefore, in the output switches for the extreme points illustrated in FIG. 5(A), those for the directions $D_5$, $D_9$, and $D_{11}$ are turned ON (non-responding status; indicated as enclosed with a circle "o" in the diagram) and those for the directions $D_{13}$, $D_{15}$, $D_1$, and $D_3$ are turned OFF. Here, an allowance $\epsilon$ is fixed with respect to the extraction of the extreme points, so that when the difference, $\delta_i$, between the projection of a candidate extreme point and that of a point of the contour being traced both obtained on a given direction exceeds the allowance $\epsilon$, the candidate extreme point is fed out as a true extreme point. This allowance $\epsilon$ is fixed, depending on the degree of minute irregularities in the contour of the pattern which are desired to be ignored in the approximation. Here, the value indicated by the two-headed arrow in FIG. 4 is used as the allowance. If $\epsilon = 0$ is assumed, then the contour of the pattern will be faithfully expressed in the approximation.

The calculation of the projection is expressed by the aforementioned formula (1). The value, $|e_i|$, of the directional vector in the right side of the formula is not necessarily "1". By assuming $|e_i| \times \epsilon$ for all the directions, the calculation of the projection can be carried out only by the calculation of inner products $(a_j, e_i)$, as already described. From the point $P_1$, the tracing of the contour is started. At a various points of the contour, inner products $(a_j, e_i)$ are calculated with respect to all the directions and decision is made as to whether the difference between the two projections mentioned above exceeds the allowance $\epsilon$ in each of the directions for which the output switches for extreme points have been turned OFF. When the difference is not greater than the allowance $\epsilon$, the current point of contour or the candidate extreme point, whichever has a greater projection, is taken as the candidate extreme point. When the difference exceeds the allowance $\epsilon$, the candidate extreme point is fed out as a true extreme point and the output switch for the extreme point for the direction in which this output is obtained is turned ON and the output switch for the extreme point for the direction diametrically opposite the direction of the output is turned OFF and the current point of the contour is taken as a candidate extreme point.

Figure 5A:
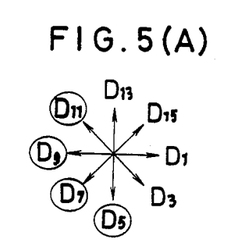
FIGS. 5(A) and 5(B) are explanatory diagrams illustrating the operation of the output switch for extreme points.
Figure 5B:
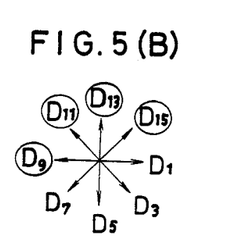

With respect to the direction for which the output switch for the extreme point is kept ON, the tracing of the contour is advancing away from that direction and the extreme point has already been fed out. Consequently, the current point of the contour is forcibly taken as a candidate extreme point. In FIG. 4, at the point $P_2$, the difference $\delta_2{}^1$ of the two projections of the points $P_1$ and $P_2$ in relation to the direction $D_{13}$ exceeds the allowance $\epsilon$, so that the point $P_1$ is fed out as the true extreme point in the direction $D_{13}$. In FIG. 5(A), the output switch for the extreme point for the direction $D_{13}$ is turned ON and the output switch for the extreme point for the direction $D_5$ is turned OFF. At the point $P_3$, since the difference $\delta_3{}^1$ between the two projections of the points $P_1$ and $P_3$ with respect to the direction $D_{15}$ exceeds the allowance $\epsilon$, the point $P_1$ is fed out as the true extreme point in the direction $D_{15}$, the output switch for the extreme point for the direction $D_{15}$ is turned ON, and the output switch for the extreme point for the direction $D_7$ is turned OFF. At the time that the tracing of the contour has passed the point $P_4$, the output switches for the extreme point for the directions $D_1$, $D_3$, $D_5$, and $D_7$ are kept OFF and those for the directions $D_9$, $D_{11}$, $D_{13}$, and $D_{15}$ are kept ON as illustrated in FIG. 5(B). At the point $P_5$, since the difference $\delta_5{}^4$ between the two projections with respect to the direction $D_7$ with the point $P_4$ exceeds the allowance $\epsilon$, the point $P_4$ is fed out as the true extreme point in the direction $D_7$.

By tracing the contour and feeding out the extreme points wherever the differences between two projections exceed the allowance $\epsilon$ as described above, there is obtained a polygonal approximation of the pattern which disregards minute concavities and convexities not exceeding the allowance $\epsilon$ as occurring between the points $P_1$ and $P_4$ and between the point $P_{25}$ and $P_{26}$. In FIG. 4, the points $P_1$, $P_4$, $P_6$, $P_8$, $P_{11}$, $P_{13}$, $P_{16}$, $P_{18}$, $P_{21}$, $P_{24}$, $P_{26}$, and $P_{29}$ are fed out as extreme points to afford a polygonal approximation which faithfully preserves the feature of the pattern given to be recognized. In accordance with the conventional "outermost point listing method", only the five points $P_1$, $P_{16}$, $P_{18}$, $P_{21}$ and $P_{26}$ are obtained as outermost points. Thus, the approximated pattern consequently obtained assumes a tetragonal shape as shown by the dotted line in FIG. 4 which no longer preserves the features of the pattern.

Figure 6:
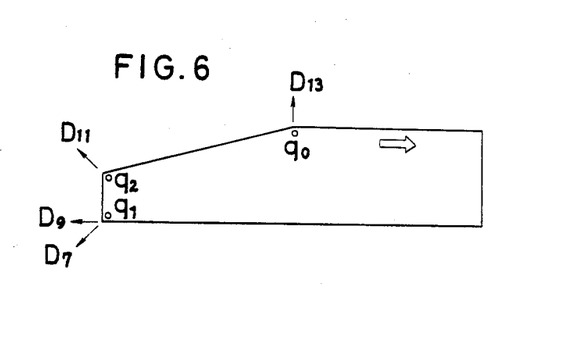
FIG. 6 is a schematic diagram for illustrating the operating principle of the output switch for extreme points.

At the time that the tracing of the contour of the pattern is started, the output switches for the extreme point for some of the directions involved are turned ON. This is because when the pattern to be recognized has such a shape as illustrated in FIG. 6, difficulty is encountered when all the switches are turned OFF. In FIG. 6, if all the switches are turned OFF, the tracing of the contour of the pattern is started at the origin $q_0$ and, after the tracing has advanced to some extent in the right (as indicated by the blank arrow), the origin $q_0$ is fed out as the extreme point sequentially with respect to the directions $D_9$, $D_7$, and $D_{11}$. The origin $q_0$ is the extreme point exclusively for the direction $D_{13}$. The actual extreme point in the directions $D_7$ and $D_9$ is the point $q_1$ and that in the direction $D_{11}$ is the point $q_2$. To prevent the trouble mentioned above, therefore, the switches for some of the directions are kept ON.

Figure 7A:
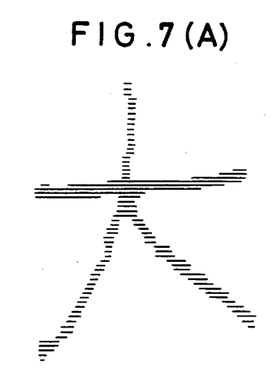
FIG. 7(A) is a diagram of a character pattern subjected to pattern reading by the system of this invention.
Figure 7B:
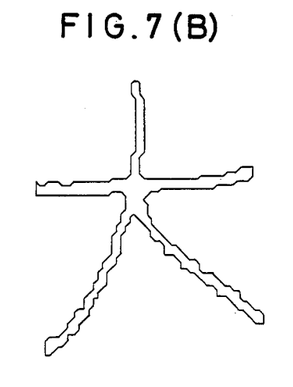
FIGS. 7(B) and 7(C) are diagrams of patterns read from the character pattern of FIG. 7(A).
Figure 7C:
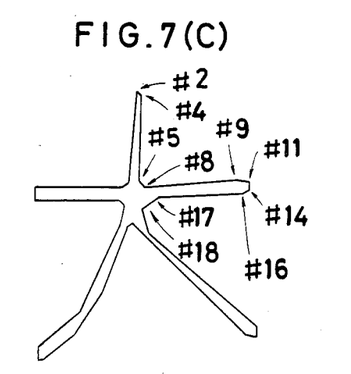
Figure 8A:
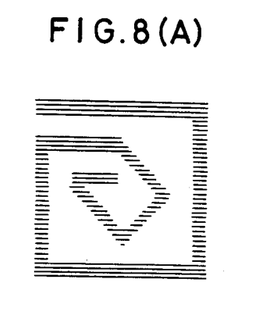
FIG. 8(A) is a diagram of a spiral pattern subjected to pattern reading by the system of this invention.
Figure 8B:
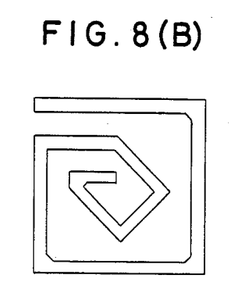
FIG. 8(B) is a diagram of a pattern read from the pattern of FIG. 8(A).

When an actual pattern such as that illustrated in FIG. 7(A), for example, is polygonally approximated on the condition of $\epsilon=0$, the result of this approximation will be as shown in FIG. 7(B). When this polygonal approximation is performed on the condition of $\epsilon=2$ (corresponding to two meshes in 64×64 meshes), the result will be as shown in FIG. 7(C). The list of extreme points obtained with respect to FIG. 7(C) is shown in Table 1 below. A pattern of the shape of a spiral as illustrated in FIG. 8(A) can be polygonally approximated as shown in FIG. 8(B).

A typical case of the extraction of convex and concave structures from the aforementioned polygonal approximation will be described with reference to Table 1. The numbers (#) indicated in FIG. 7(C) correspond to those given in Table 1. Now with reference to FIG. 7(C), the fact that the approximation points of line segments from the point #2 through the point #11 are concave structures will be studied mechanically. In table 1, the direction in which the extreme points occur from #1 through #4 is clockwise from the direction $D_{13}$ to the direction $D_{16}$. At the point #5, this direction is reversed toward the direction $D_8$ opposite the direction $D_{16}$ and then advanced counterclockwise toward the direction $D_5$ of the extreme point of #8. The direction is again reversed at #9. This means that each reversal of the direction of the occurrence of adjacent extreme points marks the vicinity of shift from a concavity to a convexity in the contour. Thus, by finding the point (#2) third backward from the point at which the direction of the adjacent extreme points is reversed from clockwise to counterclockwise and the point (#11) second ahead from the point at which the direction is reversed from counterclockwise to clockwise, the interval between these two points may as well be taken as a concave structure. As regards a convex structure, by taking the point (#8) which has one more point to pass before reaching the point (#9) at which the direction of the adjacent extreme points is reversed from counterclockwise to clockwise and the point (#17) at which the direction is reversed from clockwise to counterclockwise, there can be extracted a convex structure extending from #8 to #17. From the foregoing description, it is noted that the extraction of convex and concave structures from the polygonal approximation obtained by the method of this invention can be effected with ease.

Such feature extraction of convex and concave structures as described above can be similarly effected on a pattern such as the letter "O" which is called a "hole". When the outer boundary $O_c$ of the "hole" pattern illustrated in FIG. 9, for example, is traced until the extraction of features is completed, the operation is switched from the "tracing mode" to the "scanning mode".

| | Extreme Point Coordinate | | Extreme Point Direction | | Extreme Point Co-ordinate | | Extreme Point Direction |
|---|---|---|---|---|---|---|---|
| # | x | y | | # | x | y | |
| 1 | 28 | 1 | 13 | 31 | 28 | 31 | 14 |
| 2 | 28 | 1 | 14 | 32 | 28 | 31 | 13 |
| 3 | 28 | 1 | 15 | 33 | 28 | 31 | 12 |
| 4 | 29 | 2 | 16 | 34 | 28 | 31 | 11 |
| 5 | 29 | 22 | 8 | 35 | 27 | 32 | 10 |
| 6 | 29 | 22 | 7 | 36 | 22 | 47 | 2 |
| 7 | 30 | 23 | 6 | 37 | 16 | 57 | 3 |
| 8 | 30 | 23 | 5 | 38 | 9 | 63 | 4 |
| 9 | 52 | 20 | 13 | 39 | 9 | 63 | 5 |
| 10 | 55 | 20 | 14 | 40 | 8 | 63 | 6 |
| 11 | 55 | 20 | 15 | 41 | 8 | 63 | 7 |
| 12 | 55 | 20 | 16 | 42 | 8 | 63 | 8 |
| 13 | 55 | 20 | 1 | 43 | 8 | 63 | 9 |

-continued

| | Extreme Point Coordinate | | Extreme Point Direction | | Extreme Point Coordinate | | Extreme Point Direction |
|---|---|---|---|---|---|---|---|
| # | x | y | | # | x | y | |
| 14 | 55 | 22 | 2 | 44 | 8 | 60 | 10 |
| 15 | 55 | 22 | 3 | 45 | 17 | 52 | 2 |
| 16 | 54 | 23 | 4 | 46 | 26 | 30 | 1 |
| 17 | 34 | 25 | 12 | 47 | 26 | 27 | 16 |
| 18 | 32 | 26 | 11 | 48 | 26 | 27 | 15 |
| 19 | 30 | 28 | 10 | 49 | 25 | 26 | 14 |
| 20 | 30 | 28 | 9 | 50 | 5 | 27 | 6 |
| 21 | 31 | 31 | 8 | 51 | 5 | 27 | 7 |
| 22 | 32 | 33 | 7 | 52 | 5 | 27 | 8 |
| 23 | 57 | 52 | 15 | 53 | 5 | 24 | 10 |
| 24 | 58 | 53 | 16 | 54 | 5 | 24 | 11 |
| 25 | 58 | 53 | 1 | 55 | 5 | 24 | 9 |
| 26 | 58 | 55 | 2 | 56 | 5 | 24 | 12 |
| 27 | 58 | 55 | 3 | 57 | 26 | 23 | 4 |
| 28 | 58 | 55 | 4 | 58 | 26 | 23 | 3 |
| 29 | 58 | 55 | 5 | 59 | 27 | 22 | 2 |
| 30 | 56 | 55 | 6 | | | | |

Figure 9:
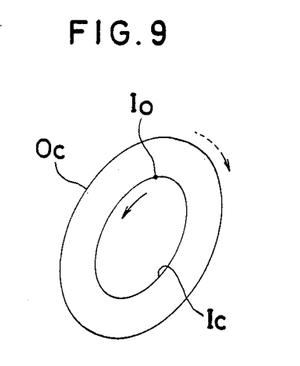
FIG. 9 is an explanatory diagram illustrating the principle of extraction of a hole segment.

When the scanning detects the inner boundary Ic of this "hole" pattern, the point Io thus detected serves as the origin for starting the tracing of the hole segments and the operation is shifted from the "scanning mode" to the "tracing mode". In this case, the direction of this tracing of the inner boundary is counterclockwise when the tracing of the outer boundary is carried out clockwise. When the "hole" pattern is formed of a closed enveloping line of regular curvature like the letter "O", the features of only concave segments is obtained as the output. In the case of a pattern of complicated line, corresponding convex and concave structures are extracted.

As described above, the convex segments, the concave segments, and the hole segments which characterize the contour of the pattern are extracted from the pattern in accordance with the data on the extreme points. Then, the results of the extraction of features are matched with the entries of the dictionary. Solely with these feature line segments, however, it is difficult to discriminate between the aforementioned letter "O" from the numeral "0", for example. As a solution of this difficulty, therefore, the "extreme point listing method" of this invention, similarly to the aforementioned conventional "outermost point listing method", adopts not only the convex and concave structures of the contour but also a histogram of the direction of the adjacent outermost points. Generally, the numeral "0" has a smaller width than the letter "O". In the 16 directions illustrated in FIG. 2, for example, the letter "O" has higher frequency of appearance of line segments in the directions of $D_{16} \sim D_2$ and the directions of $D_8 \sim D_{10}$ than the numeral "0". Thus, comparison of such histograms ought to allow clear discrimination between two similar patterns.

Now, the step of matching which comprises matching the results of the extraction of features of a given pattern with the entries of the dictionary and consequently effecting recognition of the input pattern will be described below.

This "matching" step consists of major classification, calculation of the degree of matching, and decision of the minimum dictionary.

The major classification is effected to determine the candidate dictionaries in accordance with the number of separations of the input character, the total number of phase line segments, the number of hole phase segments, and the open direction of concave segments.

The input line segments are matched against the line segments contained in each of the dictionaries selected out by the major classification as described above to find the degrees of their matching. When the content Iq of the input feature axis i ranks between (maximum value+allowable maximum width) and (minimum value−allowable minimum width) of a certain dictionary, the distance which is determined by multiplying the largest value found from among (Iq−maximum value), (minimum value−Iq), and 0 by the weight fixed by the axis i will be calculated. If Iq is greater than (maximum value+allowable maximum width) or smaller than (minimum value−allowable minimum width), a very large constant is taken as the distance for the sake of theoretically discarding Iq. The matching Ej of one given dictionary is obtained by adding the distance in the axis i to all the axes of that dictionary. As a result, the question as to whether or not the degrees of deformation in the individual axes fall within a prescribed allowance can be determined and the degree of the overall deformation as compared with the dictionary can be found as a specific value. Thereafter, by comparing the degrees of matching of all the candidate dictionaries, the smallest value Ej and the second smallest value Ej' are sought out. If Ej is smaller than the allowable largest distance and Ej'−Ej is greater than the tolerance, then the dictionary satisfying this condition is reported as the outcome of the decision. In the absence of Ej which meets this condition, the input pattern is rejected.

Figure 10:
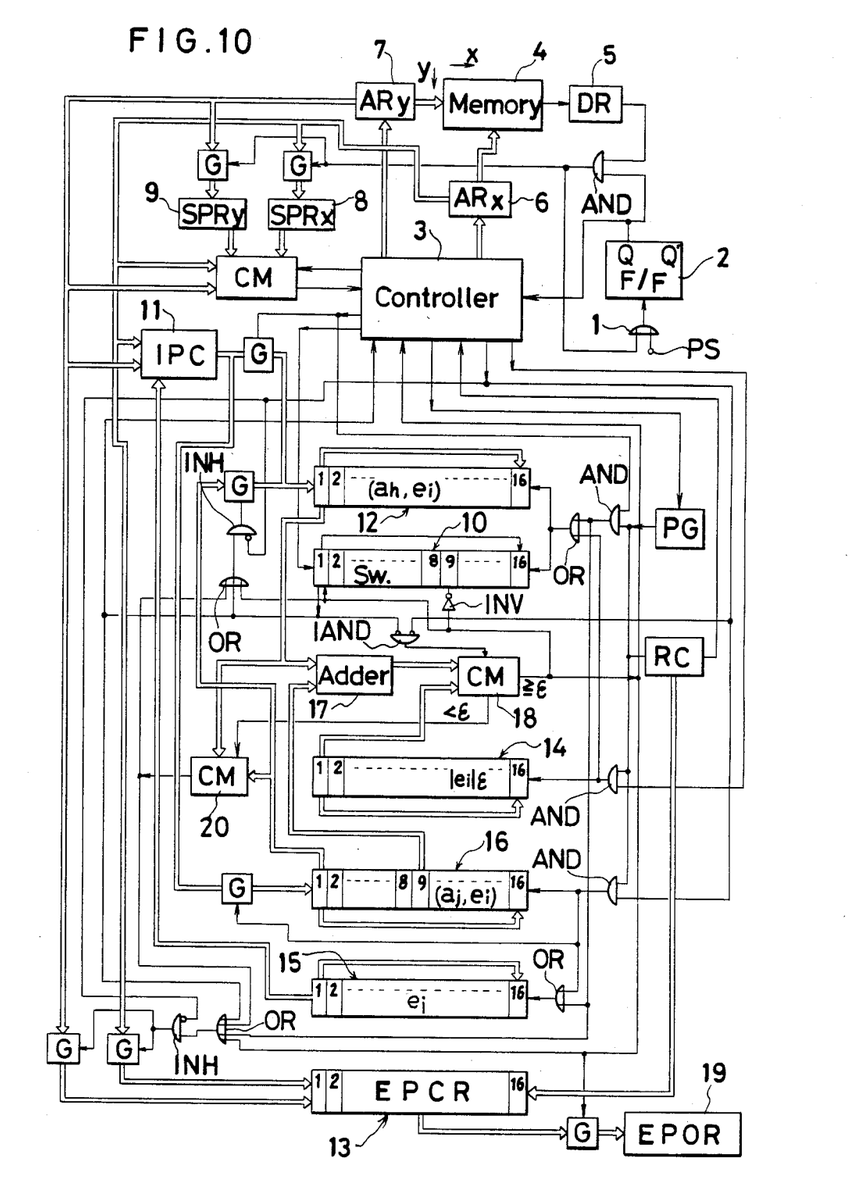
FIG. 10 is a circuit diagram for the extraction of extreme points of a figure according to the present invention.

FIG. 10 is a block diagram of a typical apparatus for working the present invention. Now, the construction and operation of the apparatus of FIG. 10 will be described.

Preparatory to pattern reading, a start signal Ps is injected into an OR gate 1 to set a flip-flop (F/F) 2 in the status of Q=1 and a control unit (controller) 3 in the start point search mode (scanning mode). In the scanning mode, a memory 4 is scanned from the background "0" until "1" is reached on the pattern, with the main scanning in the x-direction and the subscanning in the y-direction. As the scanning detects the edge of the pattern and consequently the bit signal "1" is set in a data register (DR) 5, the contents (values of coordinates) of an address register (ARx) 6 in the x-direction and an address register (ARy) 7 in the y-direction are respectively stored in start point registers (SPRy) 8 and (SPRx) 9 for the x- and y-directions, with the flip-flop 2 reversed to its tracing mode. The start point registers 8 and 9 are intended in effect to terminate the existing processing at the time that the entire contour of the pattern has been traced.

Preparatory to starting the tracing, in the output switches (Sw.) 10 for extreme point with respect to 16 directions, those for the directions $D_5 \sim D_{12}$ are turned ON and the other switches are turned OFF. An inner product calculator (IPC) 11 is operated to calculate projections ($a_h$, $e_i$) of the start point for 16 directions. The found values of ($a_h$, $e_i$) for the 16 directions are transferred to relevant extreme point candidate inner product registers 12 and start point coordinates for all the directions are set in extreme point candidate coordinate registers (EPCR) 13.

Here, it is assumed that the allowable values $|e_i| \cdot \epsilon$ and vector $e_i$ for each of the directions have been set in advance in an allowance register 14 and a vector register 15 respectively.

In the tracing mode, the inner product calculator 11, at a varying point $a_j$ of the contour, computes the inner products $(a_j, e_i)$ of the current point of the contour, with the results of the computation stored in the inner product register 16. Thereafter, a detection signal of extreme point output is issued, causing an adder 17 to compute the sum of the inner product $(a_h, e_i)$ in the $D_i$-direction of an inner product register 12 for extreme point candidate and the inner product $(a_j, e_r)$ of $r = \mod 16(i+7) + 1$ of the inner product register 16 in the direction opposite that of $D_i$, with respect to the OFF direction of the output switch 10 for extreme point. Since $e_i$ and $e_r$ are mutually opposite directional vectors and satisfy the relation of $e_r = -e_i$, the sum of the inner products in the $D_i$-direction and the $D_r$-direction will be as follows.

$$(a_h \cdot e_i) + (a_j \cdot e_r) = (a_h \cdot e_i) - (a_j \cdot e_i)$$

This calculation of the sum corresponds to the calculation of the difference between the projections on the vector of the $D_i$-direction and is aimed at simplifying the relevant circuit.

Here, the read-out contents of the Di-direction of the output switch 10 and the inner product register 12 and the read-out contents of the Dr-direction of the inner product register 16 are respectively the first and ninth values of such shift registers as being shifted i-th times. (This rule similarly applies hereinafter).

When the aforementioned sum exceeds the allowance, a comparator (CM) 18 issues a signal which causes the x- and y-coordinates of the extreme point candidate coordinate register (EPCR) 13 to be fed out into the extreme point output register (EPOR) 19 and also causes the extreme point output switch 10 to be turned ON in the $D_i$-direction and OFF in the $D_r$-direction. When the sum is less than the allowance, the inner product $(a_h, e_i)$ of the extreme candidate inner product register 12 and the inner product $(a_j, e_i)$ of the inner product register 16 are compared with each other by a comparator (CM) 20. The contents in the $D_i$-direction of the extreme point candidate inner product register 12 are exchanged for those of the current point $a_j$ of the contour when the inner product $(a_h, e_i)$ is smaller than the inner product $(a_j, e_i)$. Nothing takes place when the inner product $(a_h, e_i)$ is greater than or equal to the inner product $(a_j, e_i)$. With respect to the $D_i$-direction in which the extreme point output switch 10 is ON, the inner product $(a_j, e_i)$ and the x- and y-coordinates of the current point of the contour are forcedly set respectively in the registers 12 and 13.

When the procedure described above is carried out with respect to all the points of the contour, the points fed out into the extreme point output register (EPOR) 19 will constitute the polygonal approximation of the pattern.

In FIG. 10, PG denotes a pulse generator, RC a ring counter, and G a gate array. The double line represents a data bus and the single line a control line for allowing or obstructing the flow of data. AND stands for an AND gate, IAND for an inhibit AND gate, INH for an inhibit gate, OR for an OR gate, and INV for an inverter. These components are too obvious to require any explanation.

As described in detail above, this invention is directed to effecting the extreme point listing method by incorporating into the calculation of inner products the comparison of calculated inner products with a prescribed allowance thereby obtaining the largest inner products as the output. In accordance with this invention, therefore, polygonal approximation of a given pattern can be accomplished by causing the contour of this pattern to be traced just once, the degree of convexities and concavities of the contour desired to be extracted can be fixed freely as required by properly selecting the magnitude of the allowance to be prescribed, and the phase features such as the numbers of convexities and concavities of the contour which are useful for the recognition of a pattern particularly in the shape of a character can be easily extracted. These constitute advantageous effects of this invention.

What is claimed is:

1. A pattern reading system by line segment approximation, which comprises the steps of:

tracing the contour of a pattern given to be read and simultaneously detecting from a series of coordinate point vectors of the contour, a contour point at which the inner product of the coordinate point vector of the contour point and a directional vector in a plurality of prescribed directions has the largest value;

storing the coordinates and said inner product of the detected point in memories;

feeding out said coordinates of said detected point as an extreme point when the difference between said inner product in said detected point and inner product of a coordinate point vector of a successive contour point and said directional vector exceeds an allowance fixed in advance;

extracting convex and concave structures of said pattern by using said extreme points fed out as points of polygonal approximation in said contour of pattern, and matching a pattern composed of said convex and concave structures with a preparatorily set dictionary and reading said pattern based on maximum values of feature magnitudes.

2. A pattern reading system according to claim 1, wherein said allowance serving as a criterion for detection of extreme points is freely set depending on the degree of convexity and concavity of said given pattern desired to be ignored.

3. A pattern reading system according to claim 1, wherein extreme point output switch functions are provided severally with respect to said plurality of directions when the contour of said pattern is traced so as to detect the points of largest inner products of the vectors in said directions and said switch functions are adapted so that the output switch for the direction in which extreme points are discerned on the contour and fed out as the output is turned ON and set in a non-responding status and the output switch for the directions opposite the directions in which said extreme points are fed out is turned OFF.

4. A pattern reading system according to claim 2, wherein extreme point output switch functions are provided severally with respect to said plurality of directions when the contour of said pattern is traced so as to detect the points of largest inner products of the vectors in said directions and said switch functions are adapted so that the output switch for the direction in which extreme points are discerned on the contour and fed out as the output is turned ON and set in a non-responding status and the output switch for the directions opposite the directions in which said extreme points are fed out is turned OFF.

* * * * *